United States Patent
Koki et al.

(10) Patent No.: US 10,747,284 B2
(45) Date of Patent: Aug. 18, 2020

(54) SUPPLEMENTAL POWER RECEPTION BY BYPASSING VOLTAGE REGULATOR

(71) Applicant: Intel Corporation, Santa Clara, CA (US)

(72) Inventors: Tarakesava Reddy Koki, Bangalore (IN); Jagadish Vasudeva Singh, Bangalore (IN); Arvind Sundaram, Bangalore (IN); Vinaya Kumar Chandrasekhara, Bangalore (IN); Shobhit Chahar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 15/937,603

(22) Filed: Mar. 27, 2018

(65) Prior Publication Data
US 2019/0305563 A1    Oct. 3, 2019

(51) Int. Cl.
*G06F 1/26* (2006.01)
*H02J 7/00* (2006.01)
*H02J 7/04* (2006.01)

(52) U.S. Cl.
CPC .............. *G06F 1/263* (2013.01); *H02J 7/007* (2013.01); *H02J 7/0068* (2013.01); *H02J 7/04* (2013.01)

(58) Field of Classification Search
CPC ......... G06F 1/263; H02J 7/0068; H02J 7/007; H02J 7/04
See application file for complete search history.

(56) References Cited

U.S. PATENT DOCUMENTS

| | | | |
|---|---|---|---|
| 6,288,522 B1* | 9/2001 | Odaohhara | H02J 7/0055 320/137 |
| 7,733,060 B2* | 6/2010 | Kojima | H02J 7/0011 320/125 |
| 9,871,403 B2* | 1/2018 | Sotani | H02J 7/35 |
| 2006/0172762 A1 | 8/2006 | Sunda | |
| 2008/0254684 A1* | 10/2008 | Tracy | G06F 1/1616 439/620.21 |
| 2008/0320320 A1 | 12/2008 | Li et al. | |
| 2009/0174366 A1* | 7/2009 | Ahmad | H02J 7/0055 320/114 |
| 2016/0233780 A1 | 8/2016 | Choi et al. | |
| 2017/0040813 A1 | 2/2017 | Hu et al. | |
| 2017/0222544 A1 | 8/2017 | Kuo et al. | |
| 2018/0074574 A1 | 3/2018 | Camiolo et al. | |
| 2018/0254648 A1 | 9/2018 | Harju | |

OTHER PUBLICATIONS

Non-Final Office Action dated Mar. 3, 2020 for U.S. Appl. No. 15/927,849.

* cited by examiner

*Primary Examiner* — Stefan Stoynov
(74) *Attorney, Agent, or Firm* — Green, Howard & Mughal, LLP

(57) ABSTRACT

An apparatus is provided which includes: an input/output (I/O) port to be coupled to a device external to the apparatus; a battery having an output node; a voltage regulator to selectively supply power from the I/O port to the battery, to charge the battery; and a switch coupled between the I/O port and the output node, wherein the switch is to selectively allow flow of current from the device to the output node by bypassing the voltage regulator.

19 Claims, 12 Drawing Sheets

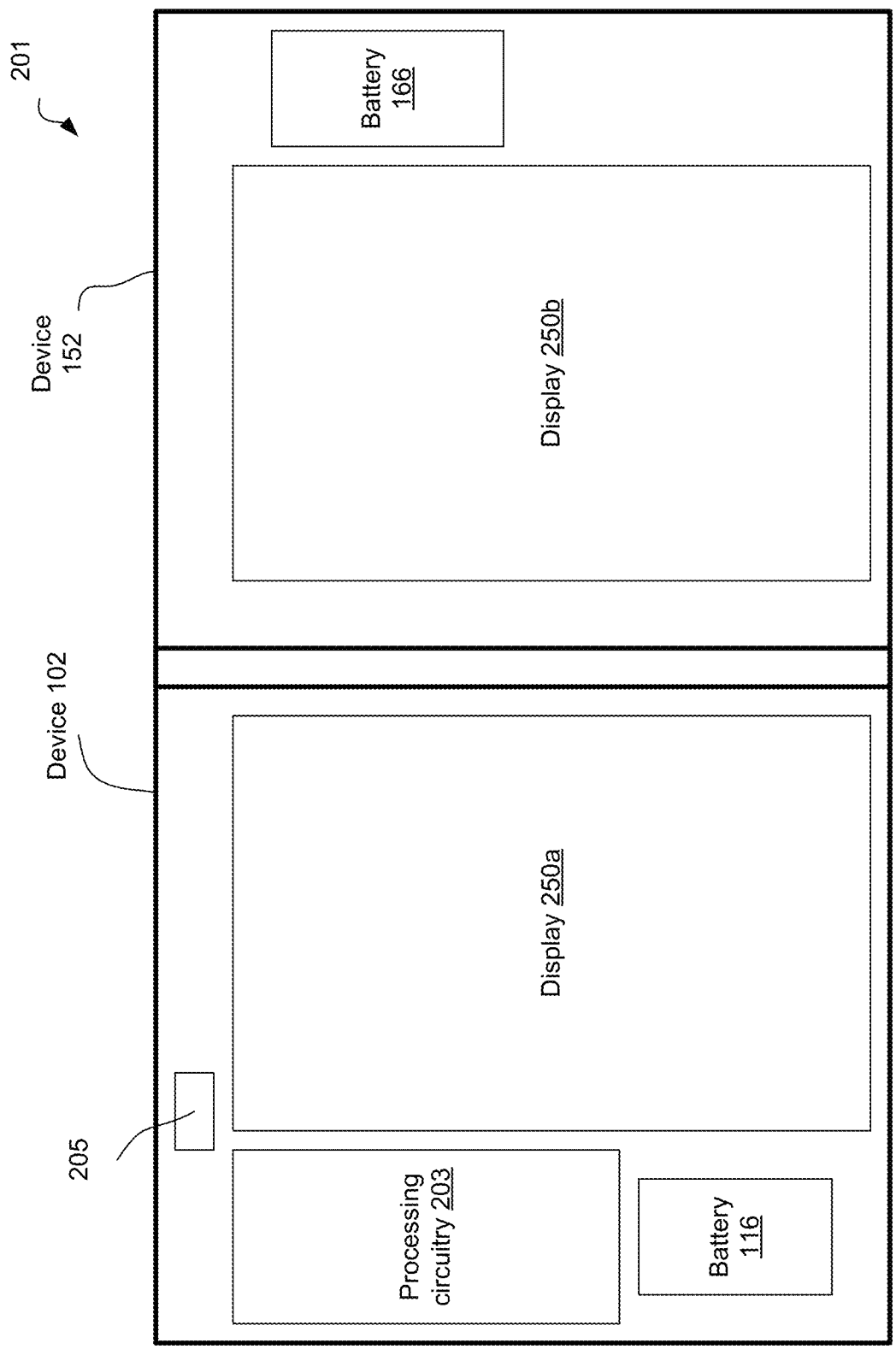

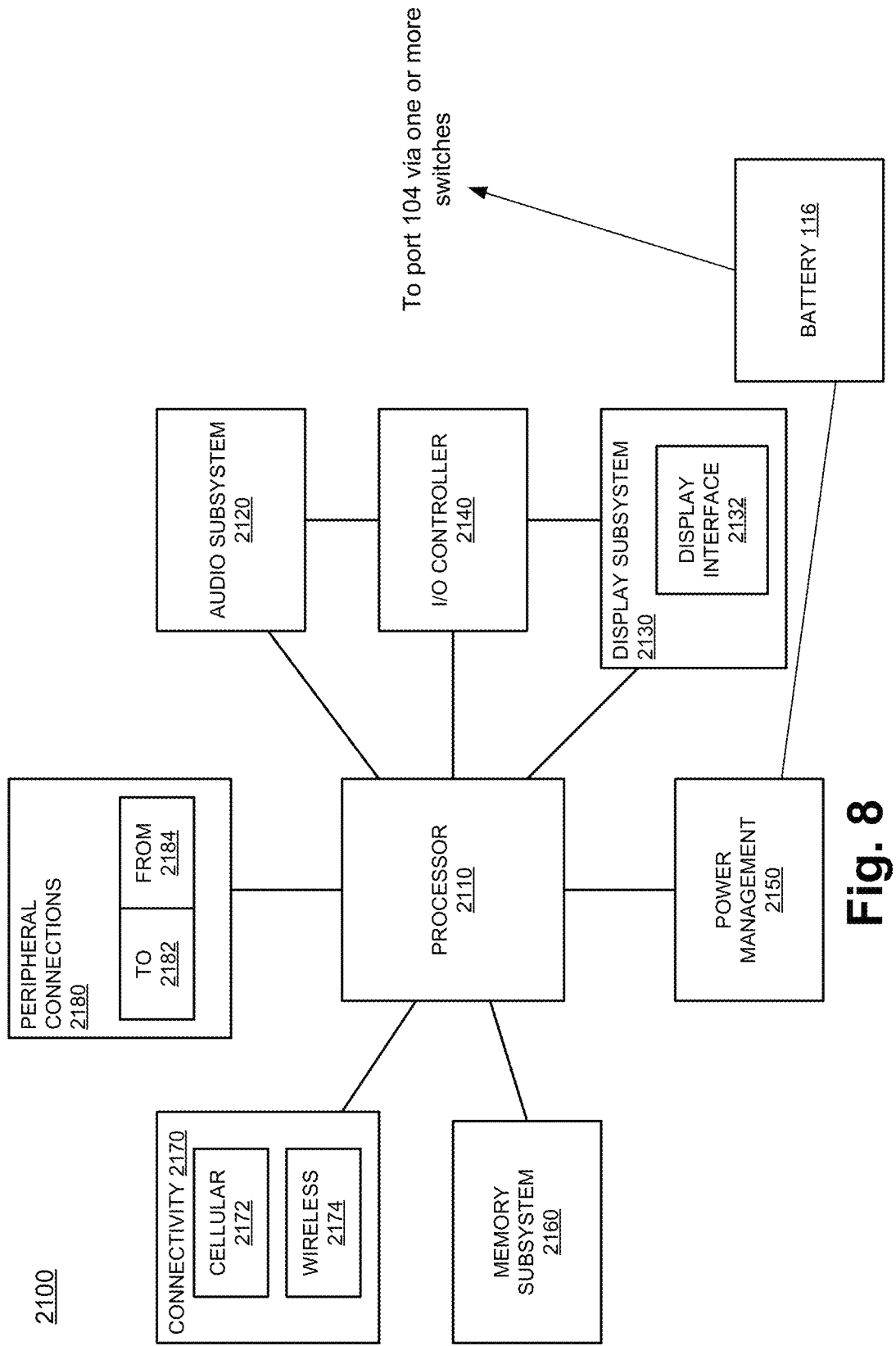

SUPPLEMENTAL POWER RECEPTION BY BYPASSING VOLTAGE REGULATOR

BACKGROUND

A computing device may operate in a high-performance mode (e.g., operate in a turbo boost mode), which may consume relatively high amount of power. Usually, if a battery of the device is not fully capable of supplying power during the high-performance mode, power from an external power supply (e.g., received via a wall adapter) may be used as a primary power source, with the battery power as the supplementary power source. In absence of such external power supply, the device may not be able to operate in the high-performance mode.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2B illustrates the first device and the second device of FIG. 1 being configured as a non-detachable dual display device, according to some embodiments.

FIG. 8 illustrates a computing device (e.g., a smart device, a computing device or a computer system or a SoC (System-on-Chip)) that is representative of the first device or of FIGS. 1-7, according to some embodiments.

DETAILED DESCRIPTION

Figure 1:
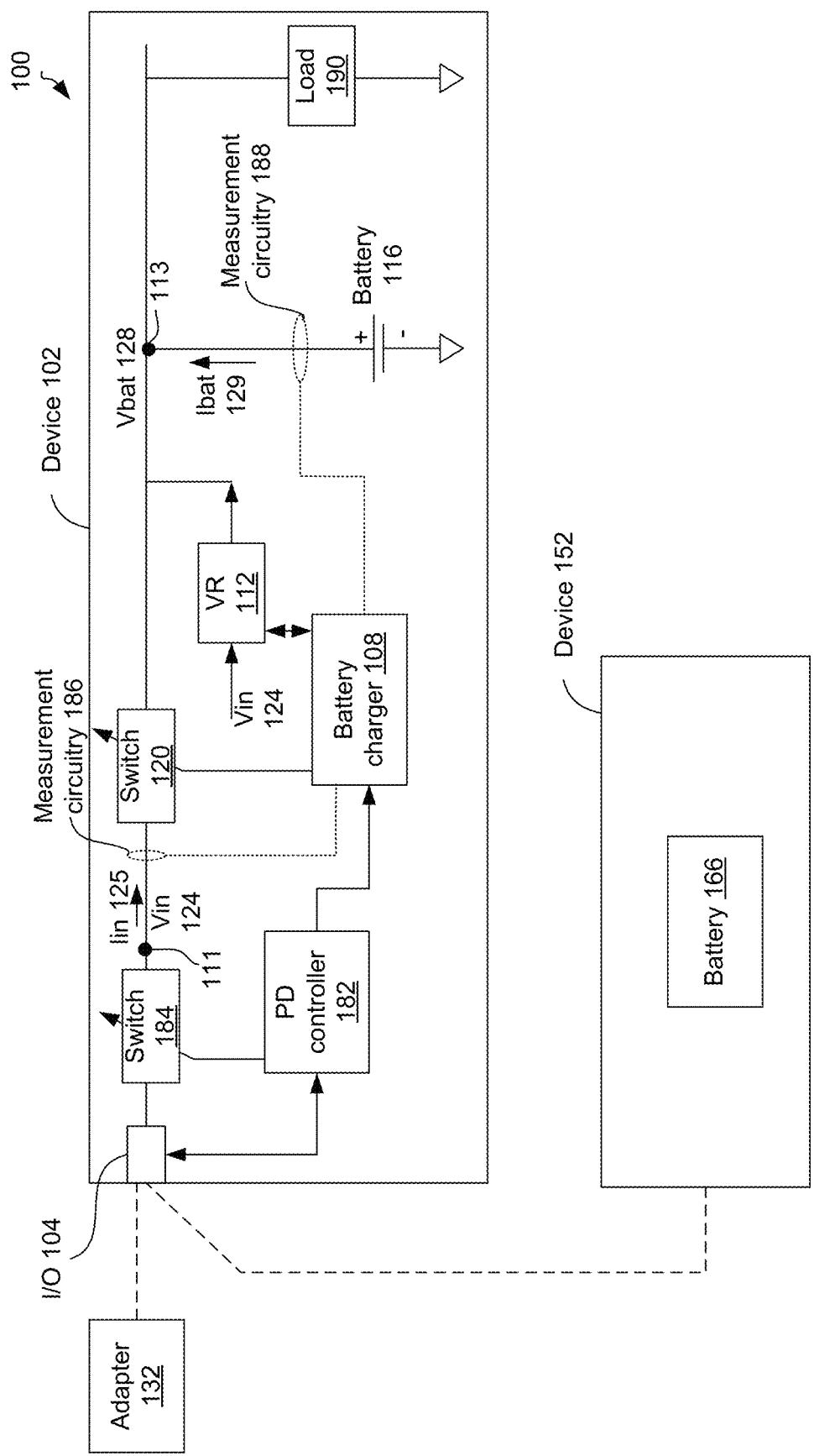
FIG. 1 illustrates a system comprising a first device to be coupled to one of an wall adapter (e.g., which may be a type-C adapter) or a second device, wherein in response to the first device being coupled to the second device, the first device is to selectively receive power from the second device during a high-power consumption mode of the first device, according to some embodiments.

Two or more devices may be attached or "fused" to form a combined device, such as a Converged Mobility Device (CMD), a dual display device, a non-detachable dual display device, etc. In some embodiments, power from one device may be used to supplement battery power from another device. Accordingly, if a first device is to operate in a high-performance mode (also referred to as high power consumption mode), the increased power to operate in the high-performance mode may be received from a battery pack of the first device and also from a battery pack of an attached second device.

Furthermore, power from the second device may flow to the first device by bypassing any power conversion components, such as a voltage regulator (e.g., assuming that the battery packs of the two devices have somewhat similar configuration, voltage rating, etc.). This may prevent possible power loss and/or latency involved in the power conversion components. Various technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "circuit" or "module" may refer to one or more passive and/or active components that are arranged to cooperate with one another to provide a desired function.

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "adjacent" here generally refers to a position of a thing being next to (e.g., immediately next to or close to with one or more things between them) or adjoining another thing (e.g., abutting it).

The term "signal" may refer to at least one current signal, voltage signal, magnetic signal, optical, or data/clock signal. The meaning of "a," "an," and "the" include plural references. The meaning of "in" includes "in" and "on."

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

It is pointed out that those elements of the figures having the same reference numbers (or names) as the elements of any other figure can operate or function in any manner similar to that described, but are not limited to such.

FIG. 1 illustrates a system 100 comprising a first device 102 to be coupled to one of a wall adapter 132 (e.g., which may be an Alternating Current or AC adapter, a USB type-C adapter, etc.) or a second device 152, wherein in response to the first device 102 being coupled to the second device 152, the first device 102 is to selectively receive power from the second device 152 during a high power consumption mode of the first device 102, according to some embodiments.

The device 102 comprises an input/output (I/O) port 104. In an example, the I/O port 104 (also referred to as port 104) may be a Universal Serial Bus (USB) Port, e.g., a USB type-C port (also referred to as USB-C port). In another example, the port 102 may be another appropriate type of USB port. In yet another example, the port 102 may be another appropriate type of port, e.g., a port that allows flow of power (e.g., in addition to, or instead of, flow of data) between the device 102 and another device (e.g., device 152) coupled to the port 104. For example, when the device 152 is coupled to the device 102 via the port 104, the devices 102 and 152 may transmit data and/or power among themselves.

In some embodiments, the port 104 may also be coupled to an AC adapter 132 (also referred to as adapter 132). For example, the adapter 132 may convert the AC power to DC power, and supply the DC power to the device 102. The adapter 132 may supply power to operate the device 102, to charge a battery 116 of the device 102, etc. In an example, when the device 102 is coupled to the adapter 132 or another external power supply (e.g., a battery bank), the adapter 132 (or the external power supply) may act as a primary power source and a battery of the device 102 may act as a supplemental power source for operation of the device 102. However, as discussed herein in further details, in some embodiments, when the device 102 is coupled to the second device 152 (e.g., where the device 152 may also want to conserve its own battery power), the device 152 may act as a supplemental power source and the device 102 may act as a primary power source, for operation of the device 102.

At a given time, at most one of the device 152 or the adapter 132 may be coupled to the port 104. Thus, the coupling between the adapter 132 and the device 102, and also the coupling between the devices 102 and 152 are illustrated using dotted lines.

In some embodiments, the device 152 may be attached to the device 102 via the port 104, and also via one or more mechanical means. For example, in dual-display and/or multi-display panel devices, stand-alone detachable devices may fuse together to become a Converged Mobility Device (CMD). For example, two or more devices may be attached or "fused" to form a CMD. A CMD can use the processing power of one or more of the attached devices, e.g., to accomplish processing tasks such as computation, trajectory prediction and/or other power intensive tasks. In some embodiments, the devices 102 and 152 may be attached to form a CMD.

Figure 2A:
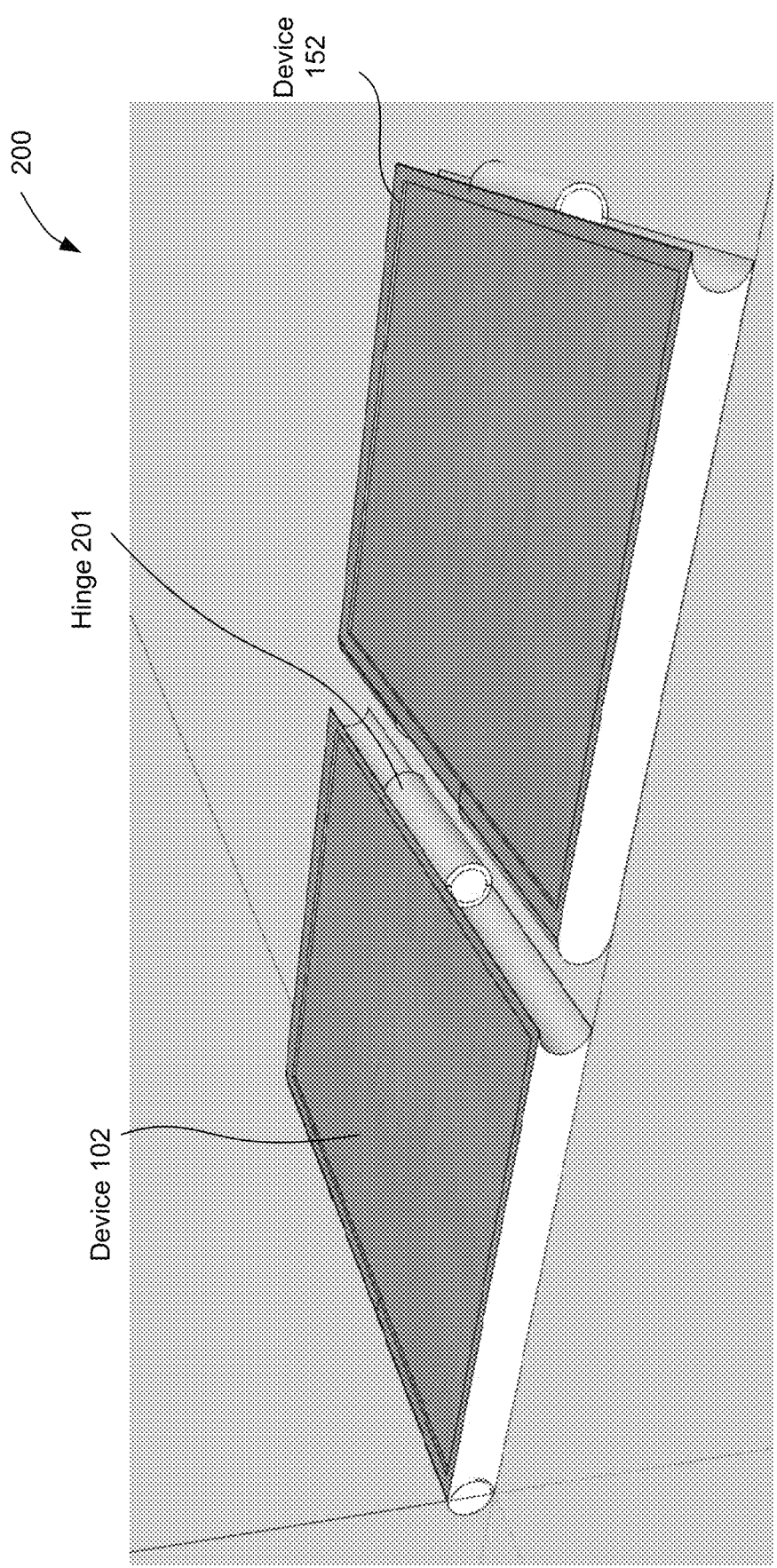
FIG. 2A illustrates a Converged Mobility Device (CMD) comprising the devices of FIG. 1, according to some embodiments.

FIG. 2A illustrates a Converged Mobility Device (CMD) 200 comprising the devices 102 and 152 of FIG. 1, according to some embodiments. In some embodiments, the device 102 may be attached via a hinge 201 to the device 152. The hinge 201 may be, for example, a magnetic hinge, a mechanical hinge, or another appropriate type of hinge. For example, the device 102 may be removably attached to the device 152 via the hinge 201.

Thus, in an example, a user may attach the devices 102 and 152, and use the devices 102 and 152 as the CMD 200. In another example, the user may also separate the devices 102 and 152, and may use the device 102 and/or the device 152 separately. Merely as an example, the devices 102, 152 may each act as a display, such that the CMD is a dual display device. Merely as another example, in the CMD 200, the device 152 may act as a virtual keyboard (e.g., a keyboard displayed on a display of the device 152), and the device 102 may act as a display of the CMD 200. Thus, the CMD 200 may act as a laptop, a tablet, a phablet, and/or the like. When used separately, individual ones of the device 102 and/or the device 152 may act as a tablet, a phablet, or the like.

In some embodiments, when attached to form the CMD 200, the I/O port 104 of the device 102 may be attached to a corresponding port of the device 152 via a connection through the hinge 201. Thus, for example, the connection between the port 104 and the corresponding port of the device 152 may not be a standard USB connection link—rather, the connection may be a customized connection (e.g., a customized USB connection) that goes through the hinge. In such an example, the port 104 may be a dedicated port for coupling to the device 152 via the hinge (or devices similar to the device 152), but may not be configured to be coupled to a AC adapter.

Although the CMD 200 is illustrated to include two devices 102 and 104, more than two devices may be included in the CMD 200. For example, multiple devices may be cascaded to form a multi-device CMD.

FIG. 2B illustrates the first device 102 and the second device 152 of FIG. 1 being configured as a non-detachable dual display device 201, according to some embodiments. In some embodiments, the device 102 comprises a display 250a, processing circuitry 203, the battery 116, and various other components discussed with respect to FIG. 1. In some embodiments, the device 152 comprises a display 250b, the battery 116, and various other components (e.g., discussed with respect to FIG. 4 herein later). The processing circuitry 203 may comprise one or more processing cores, central processing units (CPUs), graphics processing units (GPU), and/or other components. For example, the device 102 may act as a master device, primary device, or host, and the device 152 may act as a slave device or a secondary device. The device 102 may transmit contents to the device 152, e.g., to be displayed in the display 250b of the device 152. In an example, one or more user interfaces (e.g., an on-off switch 205) may be located on the primary device 102. The device 102 and 152 may be attached in a non-detachable manner.

In some embodiments, as the device 102 has the processing circuitry 203 (e.g., the motherboard of the combined device 201), the device 102 may have limited remaining space that may allow a smaller battery capacity. Thus, the capacity of the battery 116 may be relatively less, e.g., less than a capacity of the battery 166, and/or less than a capacity for operating the device 102 at the high power consumption mode of the device 102. Merely as an example, the battery 116 may have a rating of 2200 mAh (milli Watt hour), whereas the battery 166 may have a capacity of 4000 mAh.

In an example, a larger battery (e.g., a battery having a higher Whr rating) may have relatively low internal impedance, e.g., compared to a smaller Whr battery. This may allow the secondary side battery 166 to become the supplementary power to the primary side battery 116. For example, as discussed in this disclosure, the battery 166 of the device 152 may selectively provide supplemental power to the battery 116 of the device 102.

In some embodiments, the use of separate chargers and separate batteries on the primary and secondary devices 102, 152 may allow for greater thermal envelope (e.g., due to non-localized heating), enable fast charging, provide an option for the user to operate in high power consumption mode (e.g., when the secondary side battery 166 is supplying supplemental power to the primary side battery 116), or operate in an economy mode (e.g., where a user may choose to use one battery after the other), etc.

Although the devices 102, 152 are illustrated to be coupled to form the CMD 200 in FIG. 2A and the non-detachable dual display device 201 in FIG. 2B, in some other embodiments, the devices 102, 152 may be coupled via the I/O port 104, but without the devices 102, 152 being attached to form a CMD or a non-detachable dual display device. For example, in such examples, the devices 102, 152 may be coupled via standard USB cables.

Referring again to FIG. 1, the devices 102, 152 may be attached via a standard USB connection, a hinge (e.g., the hinge 201), one or more wires, one or more metal connections, and/or another appropriate connection.

Referring again to FIG. 1, in some embodiments, one of the devices 102, 152 may provide power to another of the devices. The device 152 may comprise a battery 166, that may selectively and temporarily provide power to the device 102. For example, the device 102 may receive supplemental power from the device 152, to supplement power from the battery 116.

For example, if the device 102 is to perform more computationally intensive tasks (e.g., compared to the device 152), then the device 102 may receive supplemental power from the device 152.

In another example, the device 102 may comprise relatively higher processing capability, whereas the device 152 may comprise relatively lower processing capability. In such an example, the device 102 may act as a host and the device 152 may act as a display. In such an example, the device 102 may receive power from the device 152.

In yet another example, one of the devices 102, 152 having a relatively lower battery charge level may receive power from another of the devices. Thus, in such an example, a device can receive power from another device, and this process may be reversed, e.g., based on the battery charge capacity of the devices 102, 152, workload of the devices 102, 152, temporary high power requirement of the devices 102, 152, etc.

Without limiting the scope of this disclosure, for the purposes of this and unless specified otherwise, power is assumed to flow from the device 152 to the device 102 (e.g., although power can flow in the opposite direction as well).

In some embodiments, during a peak power requirement of the device 102, the device 152 may provide supplemental power to the device 102. For example, a high power consumption mode of the device 102 implies that the power consumption of the device 102 is higher than usual. For example, due to increased workload and computation need, the device 102 may temporarily consume higher power (e.g., the device 102 may temporarily operate at a higher frequency and/or at a higher voltage level). Such a high power consumption mode of the device 102 may also be referred to as a turbo boost mode, a turbo mode, a high performance mode, a boost mode, etc. of the device 102. In some embodiments, during the high power consumption mode of the device 102, the device 102 draws supplemental power from the battery 166 of the device 152, e.g., to supplement the power from the battery 116 of the device 102.

In some embodiments, the device 102 comprises the battery 116, a corresponding battery charger 108, one or more load components 190, switches 184, 120, and a voltage regulator (VR) 112. The switch 184 may be coupled between a node 111 and the port 104. An output terminal of the battery 116 is referred to as node 113. The battery 116 may be coupled between the node 113 and a ground terminal.

In some embodiments, the switch 120, when switched on, electrically couples the nodes 111 and 113. In an example, the switch 120 may be controlled by the charger 108 (or by another appropriate component of the device 102, such as a power delivery controller 182).

In some embodiments, one or more load components 190 are coupled between the battery output node 113 and the ground terminal. Although not illustrated in FIG. 1, the load components 190 may receive a regulated output from the battery 116. For example, in such embodiments, one or more voltage regulators (different from the VR 112, not illustrated in FIG. 1) may receive the output of the battery 116 from the node 113, regulate the battery voltage Vbat 128, and supply the regulated voltage to the load components 190.

In some embodiments, the device 100 may comprise measurement circuitry 186 (also referred to as circuitry 186) to measure a voltage and/or a current of the node 111. In some embodiments, the device 100 may comprise measurement circuitry 188 (also referred to as circuitry 188) to measure a voltage and/or a current output by the battery 116. The circuitries 186 and 188, and the connection between these circuitries and the charger 108 are symbolically illustrated using dotted ovals and dotted lines.

Any appropriate measurement techniques may be used for the circuitry 186 and/or 188. Merely as an example, to measure a voltage, individual ones of the circuitries 186 or 188 may comprise a corresponding resistor—the charger 108 may measure a voltage drop across the resistors to estimate the respectively currents Iin 125 and Ibat 129.

In some embodiments, the Power Delivery (PD) controller 182 (also referred to as controller 182) may control switching of the switch 184. For example, the PD controller 182 may be associated with the port 104, which may be a USB port. For example, the controller 182 may communicate with the port 104, e.g., via one or more configuration channel (CC) signal lines between the port 104 and the controller 182. When an external component is attached to the port 104, the controller 182 may communicate configuration data with the component via the CC signal lines. The controller 182 may be aware of a type of the component coupled to the port 104, a configuration of the component, a voltage rating of the component, etc. via the CC signal lines.

The controller 182 may negotiate power delivery between the external component and the device 102 based on, for example, an appropriate power delivery protocol (e.g., an USB power delivery protocol). When, for example, power delivery between the device 102 and the external component is negotiated and allowed, the controller 182 may switch on the switch 184.

For example, when, in accordance with USB power delivery negotiations between the device 102 and the external component, the device 102 is to receive power from the external component, the switch 184 may be switched on. As illustrated in FIG. 1, the external component may be the adapter 132, the device 152, or another external component. Thus, in some embodiments, irrespective of whether the device 152 or the adapter 132 is coupled to the port 104, the switch 184 may be on (e.g., when power delivery has been successfully negotiated).

In some embodiments, when the device 152 is coupled to the device 102, the switch 102 may be selectively switched on. For example, the battery 166 of the device 152 may have a voltage rating, and the battery 116 of the device 102 may have another voltage rating. If the voltage ratings of the batteries 116 and 166 substantially match, then the switch 120 may be selectively ON, in response to the device 152 being coupled to the device 102.

However, if the voltage ratings of the batteries 116 and 166 differ, then the switch 120 may sort the outputs of the two batteries 116 and 166 that are at different voltage levels. Accordingly, if the voltage ratings of the batteries 116 and 166 differ, the switch 120 may be switched off (e.g., by the charger 108). On the other hand, if device 152 exposes its power as a programmable power supply, then the internal circuitry of device 152 can either step-up or step-down the voltage based on the configuration (e.g., voltage level) of the battery 116.

In some embodiments, once an external component (e.g., which may be one of the adapter 132 or the device 152, or another external component) is coupled to the port 104, the PD controller 182 may determine a type of the external component. For example, the PD controller 182 may determine if the external component is an type C adapter (e.g., the adapter 132), or a battery-operated device (e.g., device 152). The PD controller 182 may also determine a voltage rating of the external component.

Figure 7:
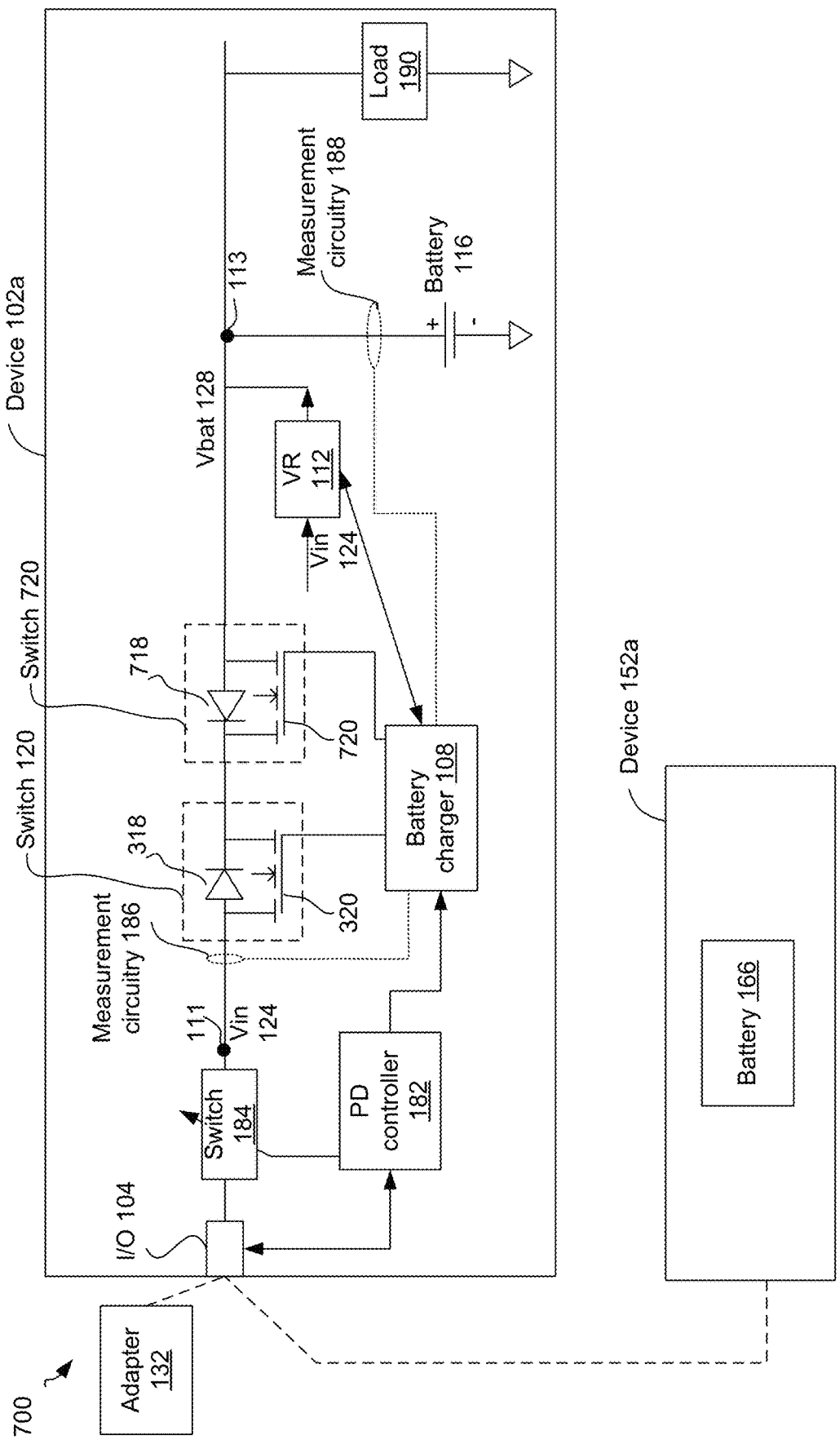
FIG. 7 illustrates a system comprising a first device to be coupled to one of an AC adapter or a second device, wherein in response to the first device being coupled to the second device, the first device is to selectively receive power from the second device during a high-power consumption mode of the first device, and wherein the first device comprises two series connected switches to control the flow of power, according to some embodiments.

Based on determining the type and/or the voltage rating, the PD controller 182 may instruct the charger 108 on switching on or off the switch 120. For example, if an AC adapter (e.g., the adapter 132) is coupled to the port 104, then the voltage output of the adapter 132 is likely to be substantially higher than the voltage rating of the battery 116. For example, the battery 116 may operate at about 5 V, while the voltage Vin 124 at the node 111 from the adapter 132 may be 20 V. If both switches 184 and 120 are ON, this may expose the battery 116 and the load 190 to a higher voltage, thereby possibly damaging these components. Thus, if the external component is the adapter 132, the switch 120 may be off, and, for example, the implementation may be as shown in FIG. 7 for any external type-C power supply In an example, the PD controller 182 may instruct the charger 108 to turn off the switch 120, based on which the charger 108 may turn the switch 120 off. In another example, the PD controller 182 may transmit to the charger 108 a type of the external component coupled to the port 104, a voltage rating of the external component, etc., based on which the charger 108 may decide on its own to turn off the switch 120. In yet another example and unlike the illustration of FIG. 1, the PD controller 182 may control the switch 120 and turn off the switch 120.

In some embodiments, the voltage Vin 124 of the node 111 may be supplied to the VR 112. For example, if the adapter 132 is coupled to the port 104 and is to supply power to the device 102 (e.g., as negotiated by the controller 182), the switch 184 is turned on, and the voltage Vin 124 is supplied to the VR 112. The VR 112 regulates the voltage level of the power from the adapter 132 to the voltage level of the battery (e.g., Vbat 128), which the VR 128 may supply to the node 113, as illustrated in FIG. 7.

In some examples, the implementation in such cases could be with back-to-back FET (e.g., switches 120 and 720 arranged such that the body diodes 318 and 718 are arranged in an opposing manner) to prevent unintentional leakage (e.g., due to body diodes 318 and/or 718). In some other examples, the implementation may be with a single FET using any other FET technology (e.g., which may be either 120 or 720) that does not have a leakage path (e.g., unlike the body diode in the case of MOSFET).

The switch 184 may be on and the switch 120 may be off even if, for example, the external component is not an AC adapter (e.g., is a battery-operated device), but still has substantially higher voltage rating than the voltage level of the battery Vbat 128. As discussed herein above, even in such a case, switching on both the switches 184 and 120 would expose the battery 116 and the load 190 to unacceptable high voltage level, and so, the switch 120 is turned off. The switch 184 may be turned on (e.g., by the PD controller 182), e.g., as the power from the external component may be channeled through the VR 112 to charge the battery 116, to supply power for operation of the device 102, etc.

Thus, put differently, if an external component coupled to the port 104 is a AC adapter and/or if the external component voltage is substantially higher than the battery voltage Vbat, then the switch 120 is turned off, e.g., to isolate the nodes 111 and 128. In such a situation, the switch 184 may be turned on, e.g., to supply Vin 124 from the external component to the VR 112 (e.g., to charge the battery 190, to supply power for operation of the device 102, etc.).

In some embodiments, if the external component attached to the port 104 is a battery-operated device (e.g., the device 152) having at least somewhat similar battery configuration (e.g., at least somewhat similar voltage rating), the switch 120 may be turned on (e.g., in addition to turning on the switch 184). In such an example, this may electrically couple the nodes 111 and 113.

Coupling the nodes 111 and 113 may directly provide the power from the battery 166 of the device 152 to the battery 116 of the device 102, e.g., when such power is needed by the device 102. Thus, for example, the power from the device 152 is provided to the battery 116 and/or the load 190, by bypassing the charger 108 and/or by bypassing the VR 112. In an example, such direct flow of power may avoid possible power conversion loss or latency in the VR 112, and may use the battery of one device 152 as a supplementary power for another device 102.

Merely as an example, the voltage rating of the battery 116 may be 5 V, and during power intensive operation of the device 102 (e.g., the high-power consumption mode), the voltage of the battery may drop to less than 5 V (e.g., may drop to as low as 4 V). The switch 120 may be turned on if, for example, the voltage rating of the battery 166 (e.g., if the voltage Vin 124 in the node 111) is between 4 V and 6 V, or between 4 V and 8 V. If, for example, the voltage rating of the battery 116 is 12 V, or 20 V, then the switch 120 may be turned off, as discussed herein earlier. The power flow from the device 152 to the device 102 is discussed herein later in further detail.

Figure 3:
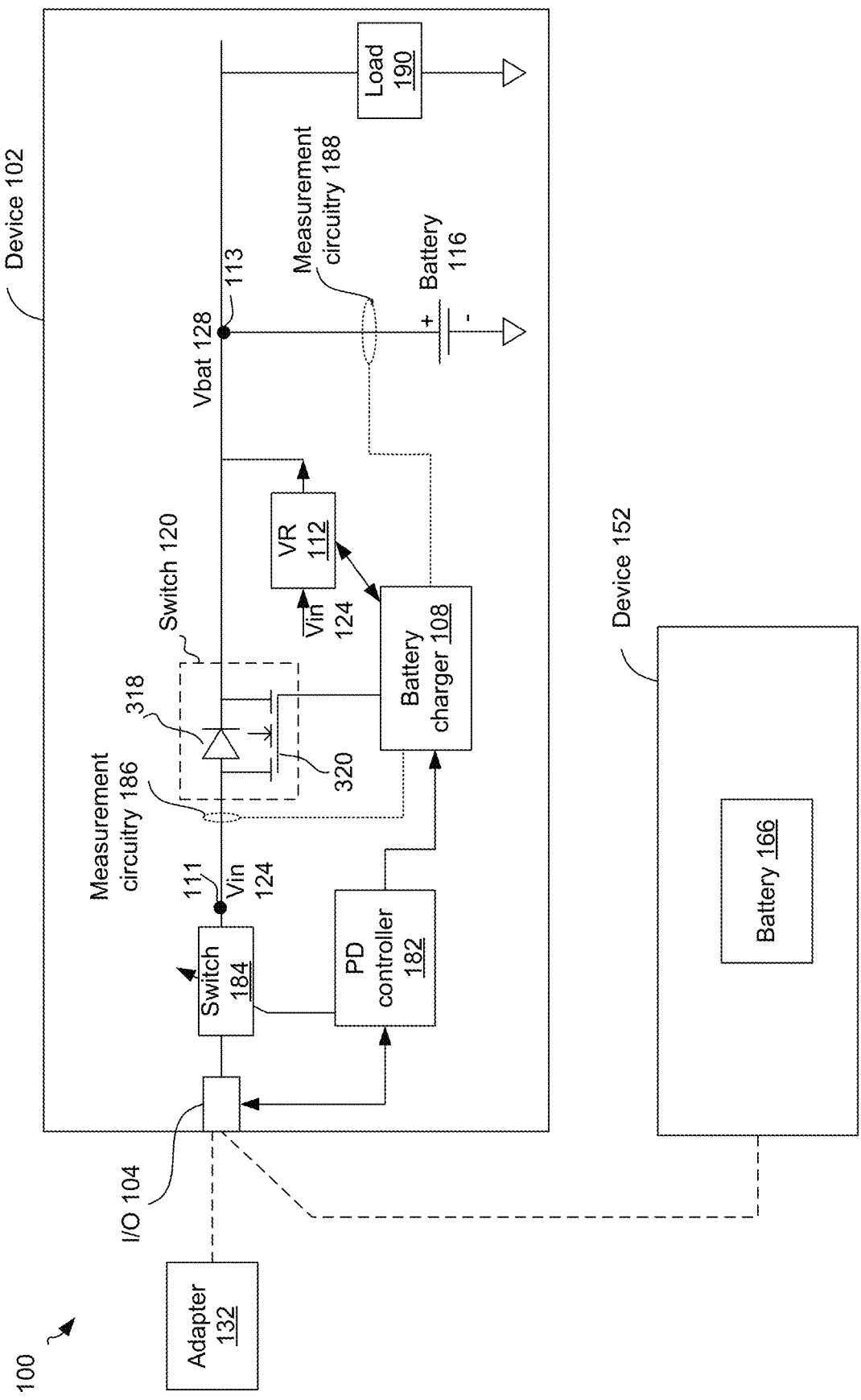
FIG. 3 illustrates an example implementation of the first device of FIG. 1 in further details, according to some embodiments.

FIG. 3 illustrates an example implementation of the first device 102 of FIG. 1 in further details, according to some embodiments. For example, in FIG. 3, the switch 120 is implemented as a transistor (e.g., a metal-oxide-semiconductor field-effect transistor (MOSFET) 320). The transistor is, for example, a N type MOSFET 320. The MOSFET 320 may intrinsically form a body diode 318 formed between a source (e.g., the node 111) and a drain (e.g., node 113), as illustrated in FIG. 3.

Figure 4:
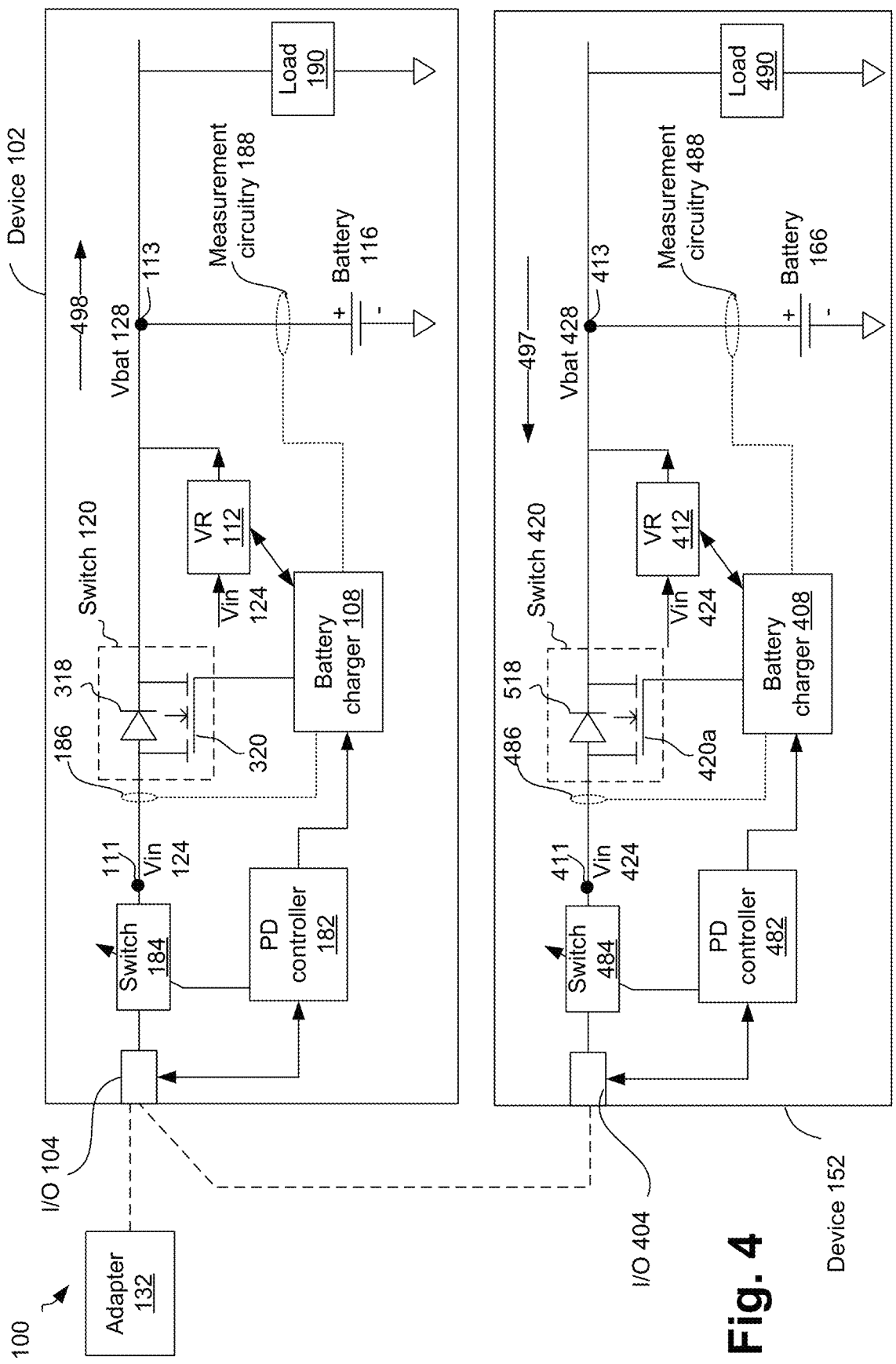
FIG. 4 illustrates an example implementation of the second device of the system of FIG. 1, according to some embodiments.

FIG. 4 illustrates an example implementation of the second device 152 of the system 100, according to some embodiments. The device 152 may, in an example, be at least in part similar to the device 102 (e.g., components associated with battery, I/O port and/or power management in the two devices 102, 152 may be at least in part similar). For example, the device 152 may comprise I/O port 404, switches 484, 420, PD controller 482, charger 408, VR 412, measurement circuitries 486, 488, battery 166, load 490, nodes 411, 428, etc., which may be at least in part similar to the corresponding components of the device 102. Directions of possible power flows in the devices 152 and 102 are respectively illustrated using arrows 497 and 498. Thus, in some embodiments, power may flow from the battery 166 to the battery 116.

Figure 5A:
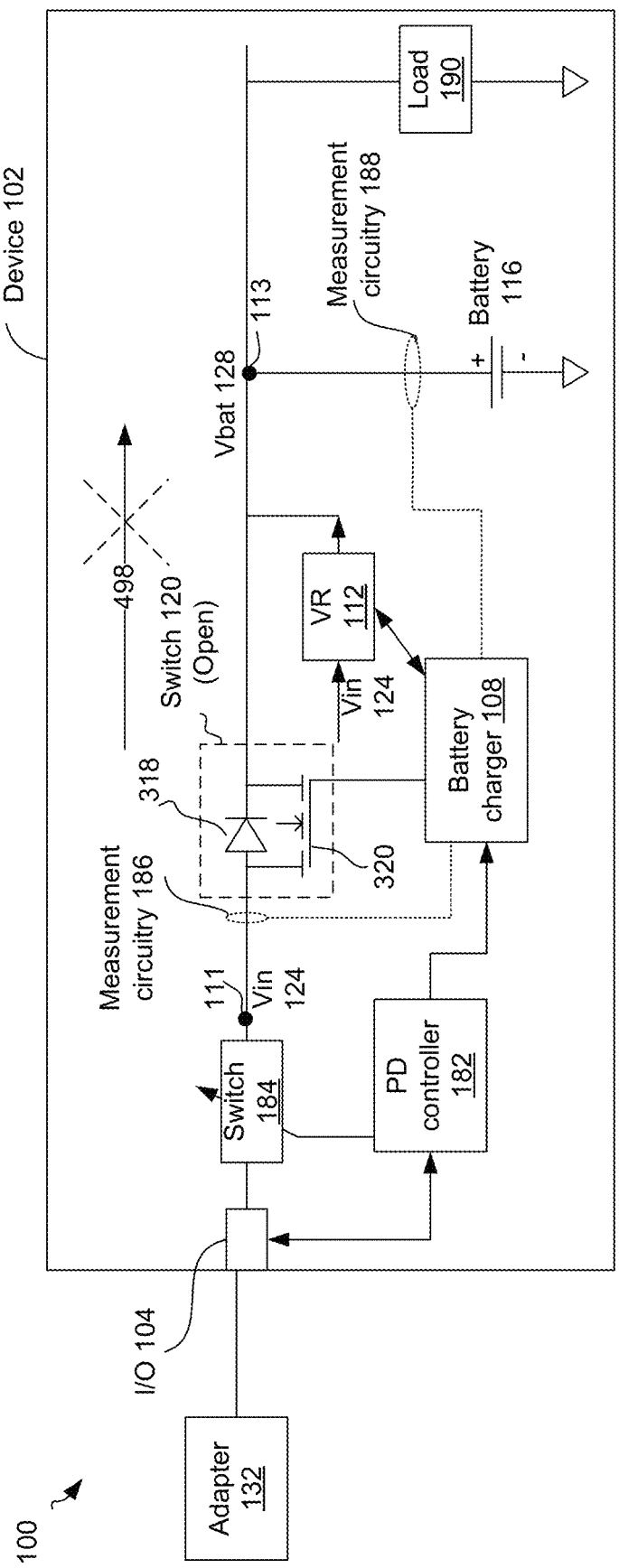
FIGS. 5A-5C illustrate various scenarios in which the first device of FIG. 1 is coupled to the AC adapter, according to some embodiments.

FIG. 5A illustrates a scenario in which the first device 102 of FIG. 1 is coupled to the AC adapter 132, according to some embodiments. As discussed herein previously, as the voltage Vin 124 from the adapter 132 is substantially higher than the battery voltage Vbat 128, both switches 184 and 120 cannot be closed (e.g., to avoid overvoltage at the battery 116 and the load 190). Accordingly, in such a case, the switch 120 may be open. In an example, the switch 184 may be closed, to allow flow of Vin 124 to the VR 112. Thus, the adapter 132 may supply power to the device 102 via the switch 184 and the VR 112 (the path from the node 111 to the VR 112 is not illustrated in the figures for the sake of illustrative simplicity). As the switch 120 is open, power transmission from the port 104 to the battery 116 via the switch 120 is not possible—this is symbolically illustrated using a dotted cross mark in the arrow 498, where the arrow 498 represents possible flow of power via the switch 120.

Figure 5B:
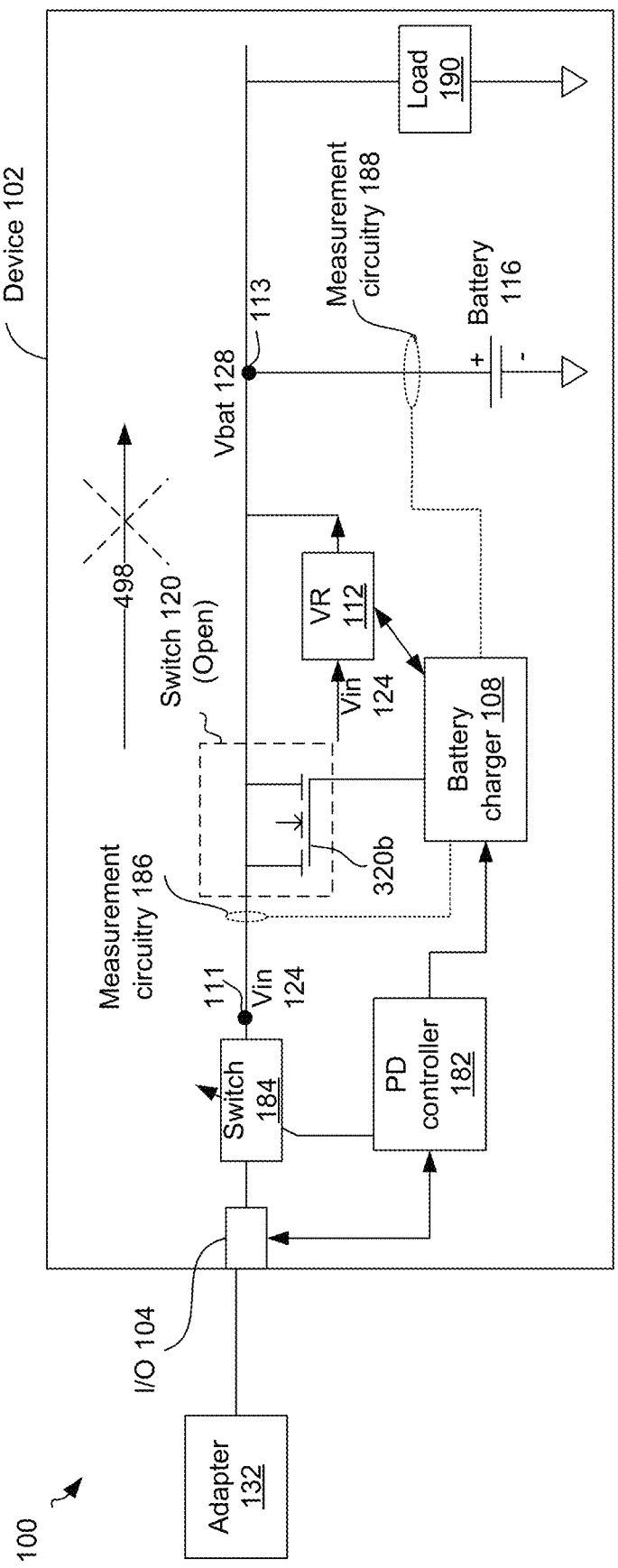

FIG. 5B illustrates a scenario in which the first device 102 of FIG. 1 (e.g., after some minor modification to the device 102 of FIG. 1) is coupled to the AC adapter 132, according to some embodiments. FIG. 5B is substantially similar to FIG. 5A. However, unlike FIG. 5A, a transistor 320b (e.g., a MOSFET 320b) of the switch 120 may not have a body diode. Similar to FIG. 5A, in FIG. 5B also the switch 120 may be open (e.g., via control from the charger 108). As the switch 120 is open, power transmission from the port 104 to the battery 116 via the switch 120 is not possible—this is symbolically illustrated using a dotted cross mark in the arrow 498, where the arrow 498 represents possible flow of power via the switch 120.

Figure 5C:
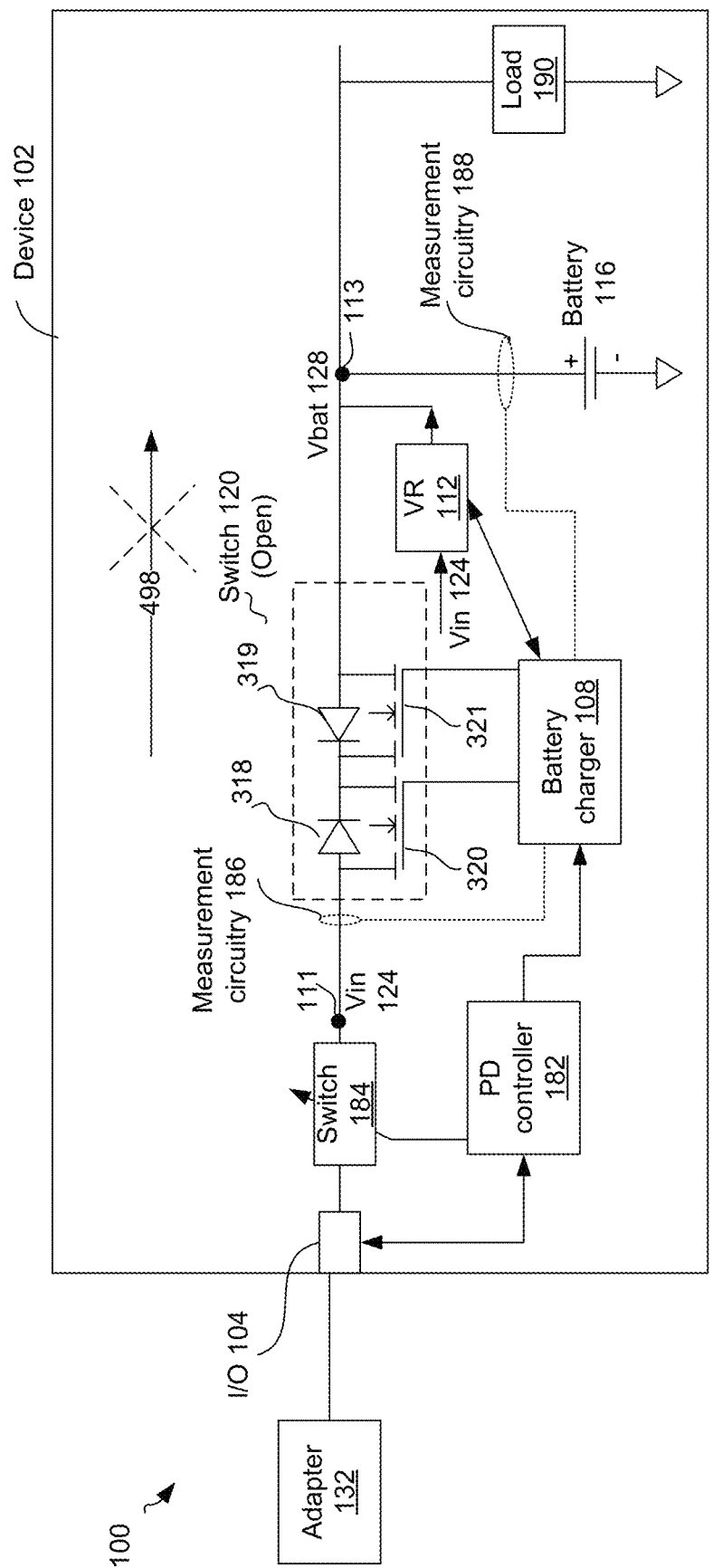

FIG. 5C illustrates another scenario in which the first device 102 of FIG. 1 (e.g., after some minor modification to the device 102 of FIG. 1) is coupled to the AC adapter 132, according to some embodiments. FIG. 5C is substantially similar to FIG. 5A. However, unlike FIG. 5A, the switch 120 comprises the MOSFET 320 and another MOSFET 321. The MOSFETs 320 and 321 are arranged in back-to-back connection, such that the body diode 318 of the MOSFET 320 and a body diode 319 of the MOSFET 321 are arranged in an opposing manner. Similar to FIG. 5A, in FIG. 5C also the switch 120 may be open (e.g., via control from the charger 108, and/or via opposing body diodes 318, 319). As the switch 120 is open, power transmission from the port 104 to the battery 116 via the switch 120 is not possible—this is symbolically illustrated using a dotted cross mark in the arrow 498, where the arrow 498 represents possible flow of power via the switch 120.

As discussed herein previously, as the voltage Vin 124 from the adapter 132 is substantially higher than the battery voltage Vbat 128, both switches 184 and 120 cannot be closed (e.g., to avoid overvoltage at the battery 116 and the load 190). Accordingly, in such a case, the switch 120 may be open (e.g., by the use of back-to-back MOSFET, by control from the charger 108, by a single MOSFET FET with no body diode, etc.). In an example, the switch 184 may be closed, to allow flow of Vin 124 to the VR 112. Thus, the adapter 132 may supply power to the device 102 via the switch 184 and the VR 112 (the path from the node 111 to the VR 112 is not illustrated in the figures for the sake of illustrative simplicity). As the switch 120 is open, power transmission from the port 104 to the battery 116 via the switch 120 is not possible—this is symbolically illustrated using a dotted cross mark in the arrow 498, where the arrow 498 represents possible flow of power via the switch 120.

Figure 6A:
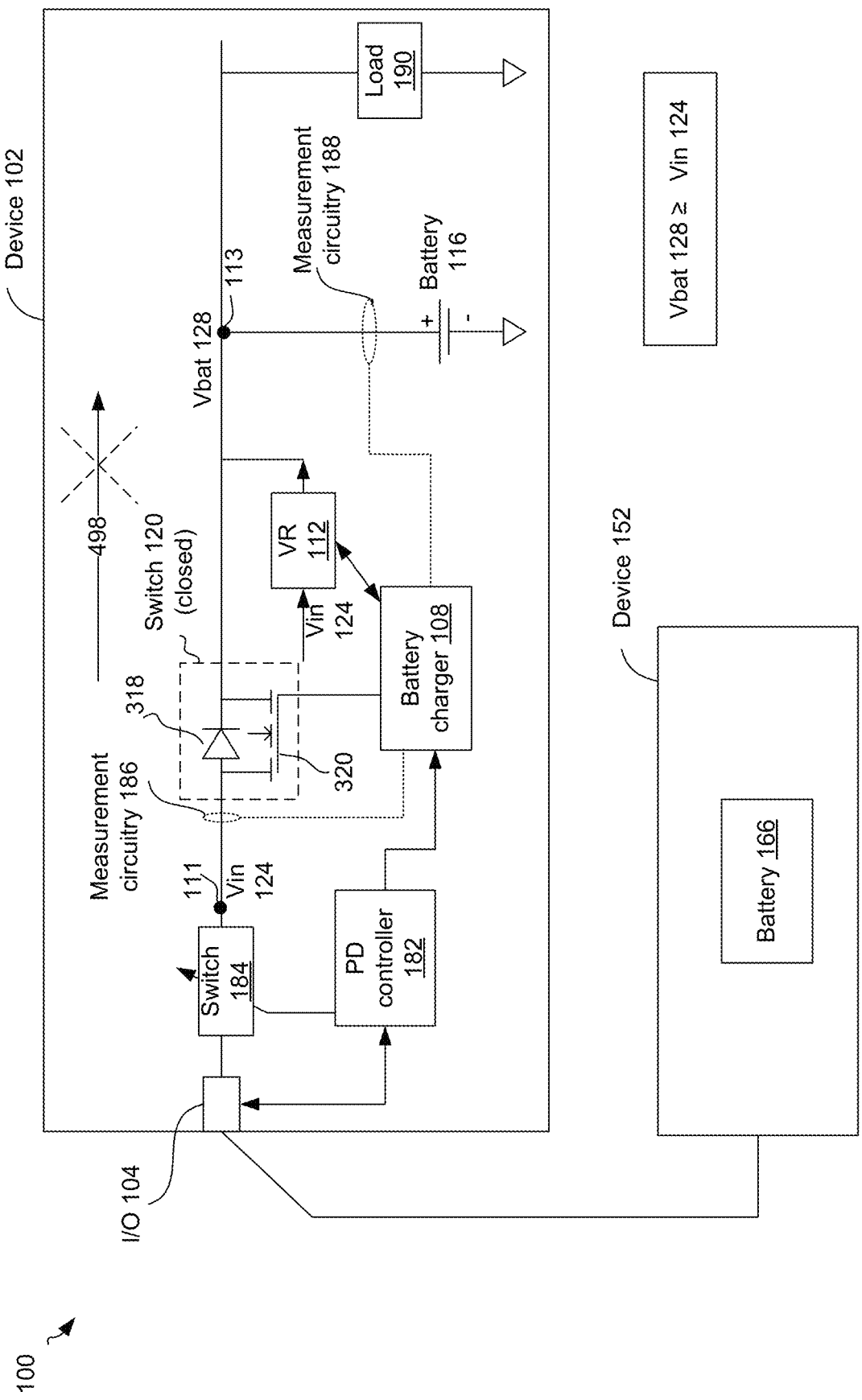
FIGS. 6A-6B illustrate two scenarios, respectively, in which the first device of FIG. 1 is coupled to the second device, according to some embodiments.
Figure 6B:
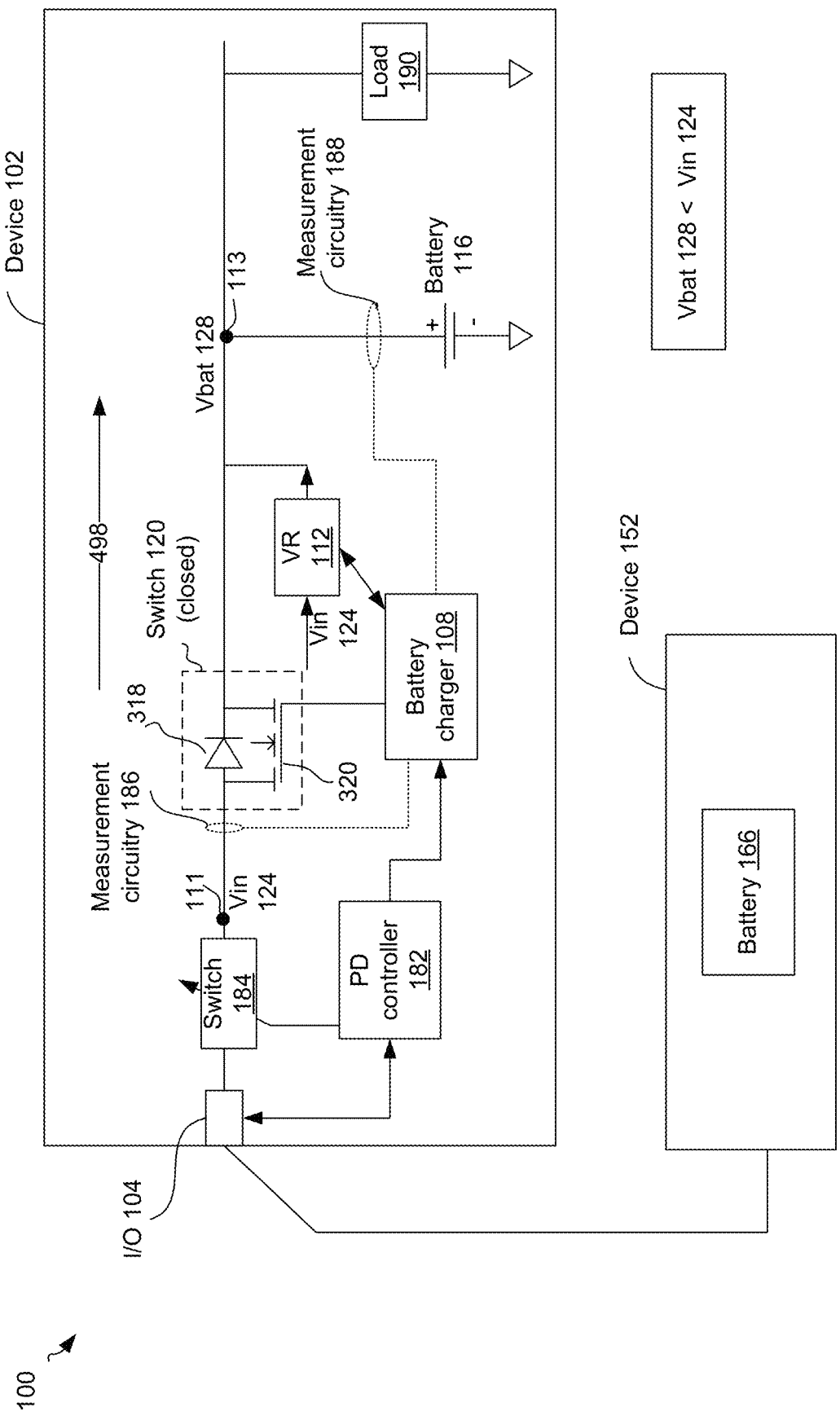

In another example where the input supply is at a higher voltage (e.g., due to wall adaptor, a Type-C adaptor or a higher voltage configuration of the battery on device 152), the switch 120 (implemented as shown in FIGS. 5B or 5C) may be open till there is a droop detected at node 113 (e.g., Vbat 128) due to a high load. Then the droop may be quenched by temporarily closing the switch 120 (e.g., closing the switch 120 for a relatively short duration), e.g., until the voltage at node 113 returns back to its normal voltage level. The charger 108 may ensure that the voltage level at node 113 is within an acceptable voltage level (e.g., maximum safety voltage level) of the battery 116 any point in time when the switch is temporarily closed FIGS. 6A-6B illustrate two scenarios, respectively, in which the first device 102 of FIG. 1 is coupled to the second device 152, according to some embodiments. Referring to FIGS. 6A-6B, as discussed herein previously, as the voltage Vin 124 from the device 152 is close to the battery voltage Vbat 128, both switches 184 and 120 can be safely closed.

Referring now to FIG. 6A, illustrated is a situation where the voltage Vbat 128 is equal to, or greater than the voltage Vin 124. This may occur when the battery 116 is fully or adequately charged, when the load 190 is operating at a normal mode (e.g., not operating at the previously discussed high power consumption mode), and/or the like. For example, power consumption at the load 190 is not excessive (e.g., the load 190 operates at a regular or normal range of voltage and/or frequency), due to which there is no substantial drop or droop in the battery output voltage.

In some embodiments, in the scenario of FIG. 6A, the switches 184 and 120 may be closed or on. However, as Vbat 128 is equal to, or greater than the voltage Vin 124, there would not be power flow from the port 104 to the node 113, even though the switches 184 and 120 are closed—this is symbolically illustrated using a dotted cross mark in the arrow 498, where the arrow 498 represents possible flow of power via the switch 120.

In some other embodiments and at least in part contrary to the above discussion (and also contrary to FIG. 6A that illustrates the switch 120 to be closed), when the device 152 is coupled to the port 104 and when Vbat 128 is Vin 124, then the charger 108 may keep the switch 120 open. For example, the charger 108 may sense the voltages Vbat 128 and Vin 124 using the measurement circuitries 188 and 186, respectively. When Vbat 128 is greater than or equal to Vin 124, there is no need or way for power to flow from node 111 to node 113. Accordingly, in such a scenario, the charger 108 may keep the switch 120 open.

Referring now to FIG. 6B, illustrated is a situation where the voltage Vbat 128 is less than the voltage Vin 124. This may occur when the battery 116 is not adequately charged, almost depleted, when the load 190 is operating at the high power consumption mode, and/or the like. For example, power consumption at the load 190 may be excessive (e.g., the load 190 operates at a higher range of voltage and/or frequency), due to which there may be a drop or droop in the output voltage of the battery 116. As a result, the voltage Vbat 128 may fall, and power may be transmitted from the battery 166 of the device 152 to the node 113 via the closed switches 184 and 120. This power from the device 152 may supplement the power supplied by the battery 116.

For example, the high power consumption mode in the device 102 may last for a relatively short time duration (e.g., a fraction of a second, a few seconds, a few minutes, etc.). Without the supplemental power from the device 152, the high power consumption mode may result in a drop of the voltage Vbat 128, thereby possibly limiting performance in the high power consumption mode. However, in FIG. 6B, supplemental power is available from battery 166 of the device 152, which may negate the drop or droop in the voltage Vbat 128.

Furthermore, in a conventional system, any supplemental power may be received via a voltage regulator. In contrast, the supplemental power in FIG. 6B is received from the device 152 by bypassing the VR 112. This may result in prevention of power loss in the VR 112, reduced latency in receiving the supplemental power from the device 152, etc.

FIG. 7 illustrates a system 700 comprising a first device 102a to be coupled to one or both of the AC adapter 132 or a second device 152a (e.g., on a single or multiple ports), wherein in response to the first device 102a being coupled to the second device 152a, the first device 102a is to selectively receive power from the second device 152a during a high power consumption mode of the first device 102a, and wherein the first device 102a comprises two series connected switches to control the flow of power, according to some embodiments.

In an example, the device 152a may be coupled to the device 102a via the port 104, and the adapter 132 may be coupled to the device 102a via another I/O port. In such an example, device 102a may use power from both the adapter 132 and the battery 166 of the device 152a.

The device 102a of FIG. 7 may be at least in part similar to the device 102 of FIGS. 1-6B. However, in the device 102, there was a single switch 120 between the nodes 111 and 113. In contrast, in the device 102a of FIG. 7, two series connected switches 120 and 720 are coupled between the nodes 111 and 113. The remaining components of the device 102a are similar to the corresponding components of the device 102, and hence, are labeled using same labels.

In FIG. 7, the switch 720 is implemented as a MOSFET, e.g., a N channel MOSFET. The MOSFET 720 may intrinsically form a body diode 718 between a source and a drain, as illustrated in FIG. 7.

In some embodiments, the switches 320 and 720 are coupled such that the body diode 318 of the switch 120 is connected in an opposite manner relative to the body diode 718 of the switch 720. Merely as an example, a source of the switch 120 is coupled to the node 111, a drain of the switch 120 is coupled to a source of the switch 720, and a drain of the switch 720 is coupled to the node 113. In some embodiments, the positions of the switches 120 and 720 may be interchanged, e.g., as long as the body diodes of these switches are coupled in opposing directions.

Although not illustrated in FIG. 7, the device 152a may also comprise two series connected switches (e.g., similar to the device 102a). For example, FIG. 4 illustrates an example implementation of the device 152. The device 152a may be formed by connecting another switch in series with the switch 420 of FIG. 4, e.g., as discussed with respect to the device 102a.

Referring again to FIG. 7, in some embodiments, having two series connected switches may prevent any exposure of overvoltage from the port 104 to the node 113. For example, assume that an AC adapter (e.g., the AC adapter 132) is coupled to the port 104. In such a scenario, voltage Vin 124 may be substantially higher than the voltage Vbat 128. Merely as an example, the voltage Vin 124 may be 20 V, whereas the voltage Vbat 128 may be 5 V. Assuming that the switches 120 and 720 are off, the high voltage Vin 124 may not even partially propagate to the node 113 via the diodes 318 and 718. For example, as the diode 718 is reverse biased, the diode 718 may prevent any possible propagation of the high voltage Vin 124 to the node 113. In contrast, in the device 120 of FIG. 3, it may be possible that power is propagated through the body diode 318 of the single switch 120 towards the node 113.

Similarly, in some embodiments, having a single switch with no internal body diode may prevent any exposure of overvoltage from the port 104 to the node 113.

Operations of the device 700 comprising the devices 102a, 152a may be similar to the operation of the device 100 comprising the devices 102, 152. For example, when the AC adapter 132 is coupled to the device 102a, the switches 120 and/or 720 are off or open (e.g., while the switch 184 may be on, to allow propagation of Vin 124 to the VR 112). No power is propagated via the body diodes 318, 718, as the body diode 718 is reverse biased.

When the device 152a is coupled to the port 104 of the device 102a and when Vbat 128 is equal to or greater than Vin 124, no power is propagated. For example, in such a scenario, one or both the switches 120, 720 may be open, thereby preventing propagation of power. In another example, in such a scenario, one or both the switches 120, 720 may be closed—but power may not be propagated from node 111 to node 113, as the voltage at node 111 is not higher than the voltage at node 113.

When the device 152a is coupled to the port 104 of the device 102a and when Vbat 128 is less than Vin 124 (e.g., during the high power consumption mode, when the voltage Vbat 128 drops), the switches 120, 720 are closed and power may flow from the device 152a to the device 102a, e.g., to supplement power available from the battery 116.

FIG. 8 illustrates a computing device 2100 (e.g., a smart device, a computing device or a computer system or a SoC (System-on-Chip)) that is representative of the first device 102 or 102a of FIGS. 1-7, according to some embodiments. It is pointed out that those elements of FIG. 8 having the same reference numbers (or names) as the elements of any other figure can operate or function in any manner similar to that described, but are not limited to such.

In some embodiments, the computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes processors 2110. The various embodiments of the present disclosure may also comprise a network interface within 2170 such as a wireless interface so that a system embodiment may be incorporated into a wireless device, for example, cell phone or personal digital assistant.

In one embodiment, processors 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise the battery 116, and the I/O port 104 (e.g., the port 1104 may be controlled at least in part by the I/O controller 2140). Various components (e.g., switches 184, 120, 720, etc.) may be included between the battery 116 and the port 104, e.g., as discussed in further details in FIGS. 1-7.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
an input/output (I/O) port to be coupled to a device external to the apparatus;
a battery having an output node;
a voltage regulator to selectively supply power from the I/O port to the battery, to charge the battery; and
a switch coupled between the I/O port and the output node,
wherein the switch is to bypass the voltage regulator to selectively allow flow of current from the device to the output node.

2. The apparatus of claim 1, wherein the switch is to prevent flow of current from an Alternating Current (AC) adapter, which is to be coupled to the I/O port, to the output node.

3. The apparatus of claim 1, wherein:
the switch is to be in a first state, in response to an AC adapter being coupled to the I/O port, and
the switch is to be in a second state, in response to the device being coupled to the I/O port.

4. The apparatus of claim 3, wherein:
the first state is an open state of the switch; and
the second state is a closed state of the switch.

5. The apparatus of claim 1, further comprising:
a first measurement circuitry to measure a first voltage of the output node;
a second measurement circuitry to measure a second voltage of an input node coupled to the I/O port; and
a controller to compare the first voltage and the second voltage, and to control the switch based at least in part on the comparison.

6. The apparatus of claim 1, wherein:
the switch is to bypass the voltage regulator to allow flow of current from the device to the output node, in response to a drop in a voltage of the battery below a threshold voltage.

7. The apparatus of claim 1, wherein:
the switch is to bypass the voltage regulator to allow flow of current from the device to the output node, in response to a drop in a voltage of the battery below a voltage supplied by the device.

8. The apparatus of claim 1, further comprising:
a hinge,
wherein the apparatus is attachable to the device via the hinge.

9. The apparatus of claim 1, wherein the apparatus is attachable to the device to form a Converged Mobility Device (CMD).

10. The apparatus of claim 1, further comprising:
a first display,
wherein the device comprises a second display, and
wherein the apparatus is attachable to the device to form a dual display device.

11. The apparatus of claim 1, wherein the switch is a first switch, and wherein the apparatus further comprises:
a second switch in series with the first switch,
wherein the first switch comprises a first body diode, and the second switch comprises a second body diode.

12. The apparatus of claim 11, wherein:
the first switch and the second switch are arranged such that the first body diode is to allow conduction in a first direction, and the second body diode is to allow conduction in a second direction opposite the first direction.

13. A system comprising:
a first device comprising a first battery, a switch, and a voltage regulator; and
a second device comprising a second battery, wherein the first device is attachable to the second device,
wherein the first device is to receive power from the second device via the switch and by bypassing the voltage regulator, and
wherein the first device is to bypass the switch to receive power from an adapter and via the voltage regulator.

14. The system of claim 13, wherein the first device is attachable to the second device to form a Converged Mobility Device (CMD).

15. The system of claim 13, wherein the first device comprises a first display, and wherein the second device comprises a second display, and wherein the first device is attachable to the second device to form a dual display device.

16. The system of claim 13, wherein the first device comprises:
a memory to store instructions;
a processor coupled to the memory; and
a wireless interface to communicatively couple the processor to another system,
wherein the first battery is to supply power to one or more of the memory, the processor, or the wireless interface.

17. An apparatus comprising:
an input/output (I/O) port;
a battery having an output node; and
a first switch and a second switch coupled between the output node and the I/O port,
wherein in response to an Alternating Current (AC) adapter being coupled to the I/O port, the first switch is to be in a closed state and the second switch is to be in an open state, and
wherein in response to a battery-operated device being coupled to the I/O port, the first switch and the second switch are to be in the closed state, and
wherein the first switch and the second switch are operable to route power from the battery-operated device to the battery, in response to the apparatus being in a high power consumption mode.

18. The apparatus of claim 17, further comprising:
a voltage regulator,
wherein in response to the AC adapter being coupled to the I/O port, the first switch is to route power from the AC adapter to the battery via the voltage regulator.

19. The apparatus of claim 18, wherein in response to the battery-operated device being coupled to the I/O port, the first switch and the second switch are to route power from the battery-operated device to the battery by bypassing the voltage regulator.

* * * * *